United States Patent [19]
Rolfe

[11] Patent Number: 5,561,972
[45] Date of Patent: Oct. 8, 1996

[54] CUTTER

[76] Inventor: James G. Rolfe, 106 Balmoral Rd., Mount Eden, Auckland 1003, New Zealand

[21] Appl. No.: 343,545
[22] PCT Filed: May 25, 1993
[86] PCT No.: PCT/NZ93/00044
§ 371 Date: Nov. 29, 1994
§ 102(e) Date: Nov. 29, 1994
[87] PCT Pub. No.: WO93/23986
PCT Pub. Date: Dec. 9, 1993

[30] Foreign Application Priority Data

May 29, 1992 [NZ] New Zealand ............................ 242976

[51] Int. Cl.⁶ ................................................ A01D 34/73
[52] U.S. Cl. ....................... 56/295; 56/17.5; 56/DIG. 17; 56/DIG. 20
[58] Field of Search ............................ 56/295, 255, 17.5, 56/320.2, DIG. 17

[56] References Cited

U.S. PATENT DOCUMENTS

| | | | |
|---|---|---|---|
| 2,737,772 | 3/1956 | Jacobsen | 56/295 |
| 2,809,488 | 10/1957 | Sewell | 56/17.5 X |
| 3,085,386 | 4/1963 | Slemmons | 56/295 X |
| 3,220,170 | 11/1965 | Smith et al. | 56/295 X |
| 3,382,653 | 5/1968 | De Buigne | 56/17.5 X |
| 3,755,999 | 9/1973 | Meyer et al. | 56/295 |
| 4,213,289 | 7/1980 | Kamppinen | 56/295 |
| 4,318,268 | 3/1982 | Szymanis | 56/255 |
| 5,033,259 | 7/1991 | Adcock | 56/295 |
| 5,094,065 | 3/1992 | Azbell | 56/295 X |

FOREIGN PATENT DOCUMENTS

87704/75 6/1977 Australia ................................ 56/295

*Primary Examiner*—Stephen J. Novosad
*Attorney, Agent, or Firm*—Young & Thompson

[57] ABSTRACT

A blade assembly for a lawn mower has a generally planar body (1) rotationally balanced about a vertical central shaft (24), with four projecting blades (6) extending radially from the periphery of the planar body. The planar body (1) is shaped with vanes (3) to form a fan-like impeller. The impeller is arranged to create a strong rotational flow, which carries air and cut material around the blade assembly in use. The projecting blades (6) create an updraft in a peripheral region of the blade assembly, while the vanes (3) of the planar body (1) are shaped to create a regulated, relatively light downdraft towards the central shaft (24). If the mower is provided with an outlet (25) for a catcher, the strong rotational flow overwhelms any influence of the relatively light downdraft, and the air with the clippings is carried centrifugally through the outlet (25). If the outlet (25) is closed or the mower has no catching facility, the air and clippings continue to flow around the blade assembly in a turbulent, shallow spiral inwards and downwards, to be discharged as a mulch into the lawn under the mower.

34 Claims, 6 Drawing Sheets

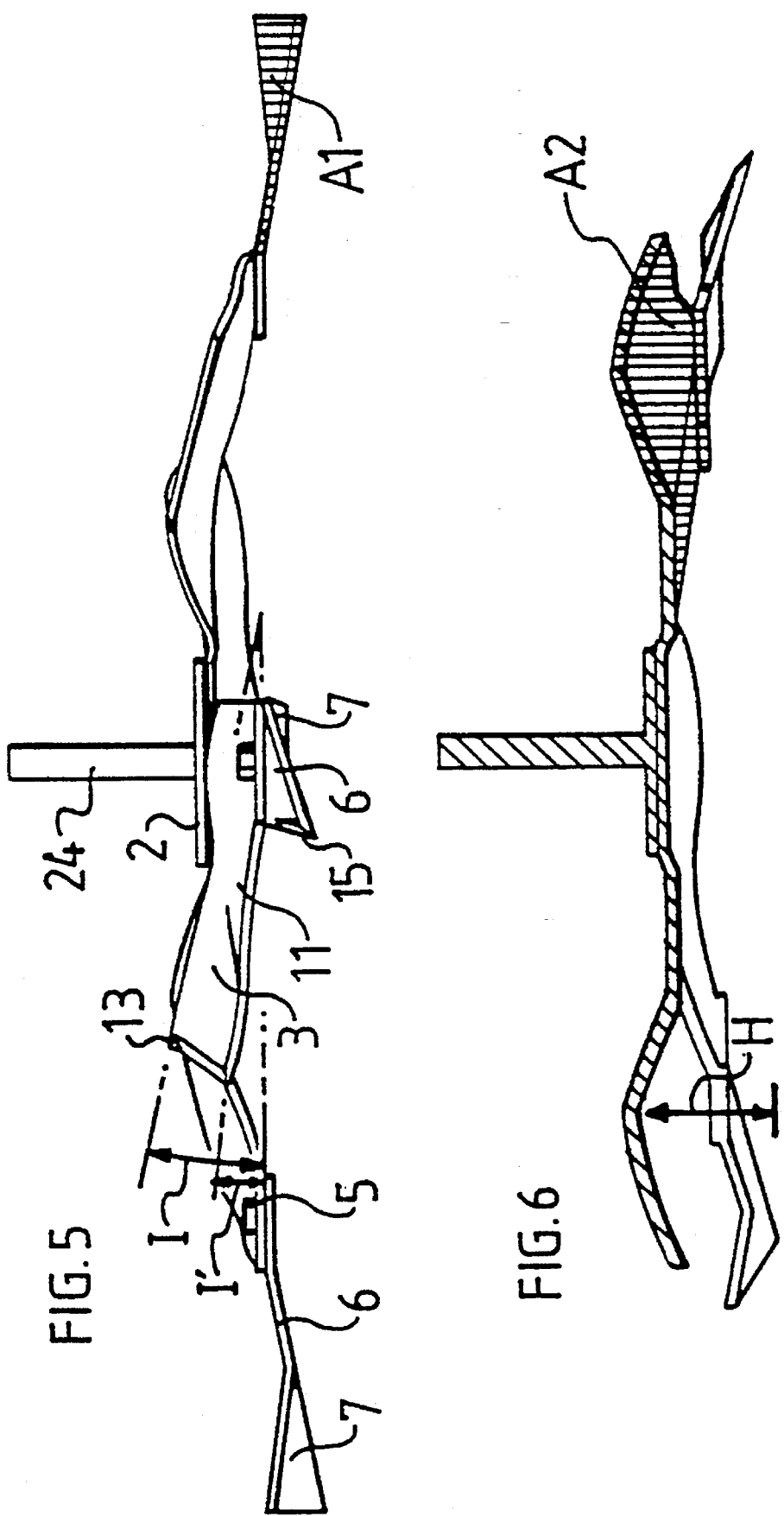

CUTTER

FIELD OF THE INVENTION

The invention relates to the general field of lawnmovers and other cutting apparatus of the rotary type, with particular application to dual discharge lawn mowers, wherein the grass, leaves and the like can either be cut and discharged via a discharge chute in the blade housing, (referred to herein as catching or scattering"), or alternatively cut into smaller particles and dispersed back onto and into the lawn, (referred to herein as "mulching").

BACKGROUND OF THE INVENTION

Lawnmowers have generally hitherto been designed either to catch lawn clippings in a catcher for disposal, or to recut or mulch clippings and discharge them back into the lawn.

Prior art lawnmower blades, whether disc and flail blades or bar type blades, designed for ejection of the clippings via a discharge chute in the blade housing do not mulch and disperse the clippings satisfactorily back into the cut lawn even when mounted to a lawnmower housing designed for this purpose.

Lawnmower blades designed for mulching and discharge of clippings back into the lawn often fail to operate satisfactorily in wet grass, and also do not satisfactorily perform catching or scattering of clippings, especially if the discharge chute is disposed rearwardly in the blade housing. Various forms of blades have been designed for the purpose of cutting and mulching the grass and dispersing of the clippings back into the lawn, as described in U.S. Pat. Nos. 2,809,488, 3,003,298, 3,382,653, 3,531,923, 4,134,249, 4,292,791) and 4,617,788.

These mulching blades typically produce uplift and/or downdraft, which in conjunction with a suitably shaped blade housing causes a cycling of air and clippings substantially inwards and downwards as the means for dispersing the clippings into the lawn, and do not perform said dispersal satisfactorily when fitted to a lawnmower with restrictions or variations in the height of the blade housing, such as a raised discharge runway.

The prior art includes attempts to achieve dual operations, either discharging clippings into a catcher or alternatively dispersing the same back into the lawn, such as in U.S. Pat. Nos. 3,085,386, 3,132,457 and 3,192,692, which show a mulching assembly with allowance for a discharge opening in the blade housing.

The housing does not include a raised discharge runway to facilitate discharge of the clippings into a catcher, as such a runway would tend to disrupt the aforementioned cyclical airflow and adversely affect the dispersal of the clippings into the lawn when mulching. The discharge opening is positioned on the side, rather than the rear of the blade housing to allow removal of the clippings from within the blade housing as soon as possible.

The catching performance is relatively poor because this type of blade does not produce significant circumferential circulation within the blade housing to effectively eject the clippings out of the blade housing and into a catcher. The inwards and downwards circulation generated by the prior art mulching blades causes a substantial proportion of the grass clippings to be recut before being discharged from the blade housing when catching. This mices moisture and juices from the clippings, which can cause clogging and make emptying the catcher difficult, especially if the grass being cut is wet or lush. An appreciable portion of the clippings also tend to be dispersed into the lawn in the process. The fine mulch does not lend itself to being discharged with sufficient energy to compact well into the catcher.

Furthermore, said prior an bar type blades exhibit a noted tendency towards bending or deforming the engine or blade shaft to which they are attached at times when certain obstructions are encountered, due to the end of the blade being forced downwards as it moves forwards under the obstruction. This is due in pan to the particular configuration of the extreme outer cutting tip.

A further problem encountered with the prior blade mentioned above is the tendency to enwrap certain types of leaves, especially long leaves such as flax, as well as pieces of rope or cord encountered on the lawn around the crankshaft, due to the upwards and inwards flow of air, which tends to carry such material towards the crankshaft.

Mulching blades by and large suffer from a relatively high level of abrasion due to the presence of the cut material, including grit being held in circulation within the blade housing before being dispersed onto the lawn. This extra wear loading affects the outer end, especially the cutting edge as well as the lifting from the trailing edge, necessitating replacement of the entire blade assembly because of wear mainly at these points. The sharp cutting edge of the prior an blade discussed tends to become blunt and deformed when obstructions to the blades travel are met.

The prior an includes a number of embodiments which utilize a fan or perforate disc for producing airflow and/or downdraft, such as those described in U.S. Pat. Nos. 2,737,772, 2,796,714, 2,888,796, 3,110,996, 3,170,276, 3,220,170, 3,905,181 and 4,161,096 in an attempt to address some of the above-mentioned drawbacks. These blade systems are designed to work by and large in conjunction with a particular blade housing configuration, and do not satisfactorily mulch nor necessarily effect satisfactory catching of discharged clippings when affixed to other commonly used lawnmower housings.

A noted drawback with conventional disc and flail blades is the possibility for the flail blade to rotate backwards and strike the body of the disc at times when an obstruction is encountered. This not only tends to damage or deform the flail blade and the disc itself, but may at times result in jamming of the flail blade below the disc body, requiring freeing manually at the expense of safety and convenience.

None of the above systems address the range of disadvantages noted above to a satisfactory degree, nor provide a cutting system which can be transported to a variety of blade housing configurations and maintain satisfactory performance whether catching, scattering or mulching the grass clippings and the like.

OBJECT

It is an object of the present invention to go at least partway towards providing a novel improved rotary blade assembly, or at least to provide the public with a useful choice.

DEFINITION OF TERMS

"Lawnmower" refers herein to a device used generally for mowing or trimming grass and other types of vegetation, conventionally powered by a small internal combustion engine or electric engine.

"Catching" refers herein to the process of ejecting cut clippings and the like from the blade housing via a discharge chute and into an attached container which collects the clippings.

"Mulching" refers herein to the process of recurring the clippings and the like into smaller pieces and also dispersing these pieces down onto and into the lawn.

The "solidity ratio" refers herein to the area of an article in plan view given as a fraction of the total plan area swept by that article in rotation. For instance, of the total area which an article covers in one revolution about its axis of rotation is considered as 1.0, an article which occludes half of this plan area has a solidity ratio of 0.5, while a solid circular disc, which occludes the whole area swept in rotation, would have a solidity ratio of 1.0.

The "face area" refers herein to the radially and axially extending surface area of a rotatable article, relative to its axis of rotation, including any inclined or curved surfaces which have a radial and an axial component.

"Rotational circulation" refers herein to the movement of air along with entrained lawn clippings and the like around the central axis of the assembly.

"Circumferential circulation" refers herein to rotational circulation around the peripheral portion of the blade assembly.

"Angle of incidence" refers herein to the angle made from the horizontal, commonly known as the angle of attack, across the chord of an object.

SUMMARY OF THE INVENTION

A blade assembly according to the present invention includes:
 means for mounting on a central shaft;
 a generally planar body substantially evenly disposed about said means for mounting on a shaft, comprised of an inner region and a peripheral region:
 means for cutting in said peripheral region;
 means for creating updraft in said peripheral region;
 means for creating downdraft in the inner region;
 and means to create a rotational airflow, comprised of a radially and axially extending face area of said body, by which air can be moved as said body rotates on said shaft;
 wherein the said face area of said inner region is greater than the face area of said peripheral region.

Preferably the inner region has a plan solidity ratio greater than 0.5.

Without limiting the generality of the forgoing, the preferred form of the present invention provides means for producing primary airflows including updraft and rotational circulation; and secondary airflows which include swirling and eddying of air, tip vortices, and downdraft, wherein the secondary airflows are regulated so as to be insignificant relative to the primary airflows when the assembly is used in an open housing, but to take effect when the assembly is used in an enclosed housing.

BRIEF DESCRIPTION OF THE DRAWINGS

Aspects of the present invention will be better understood with reference to the following detailed description of a preferred embodiment, given by way of example, with reference to the accompanying drawings, in which:

FIG. 5 shows a side view of the blade assembly, as seen in the direction of arrow A in FIG. 4.

FIG. 6 shows a cross-sectional view of the assembly as seen along line B—B in FIG. 4.

DETAILED DESCRIPTION OF THE PREFERRED EMBODIMENT

In its preferred form as illustrated in FIGS. 1 to 9, the invention provides a blade assembly for lawn mowers which may be used in different ways to achieve different results. In particular, the preferred embodiment may be used for:

1. Mulching of grass clippings and the like if discharge chute is suitably enclosed.

2. Dispersing clippings by scavenging such from inside the blade housing and dispersing such onto and into the lawn of the discharge chute is suitably enclosed.

3. Catching of grass clippings, leaves and the like via a discharge chute in the blade housing if said discharge chute is open.

4. Scattering of said clippings via a discharge chute in the blade housing of said discharge chute is open.

Figure 1:
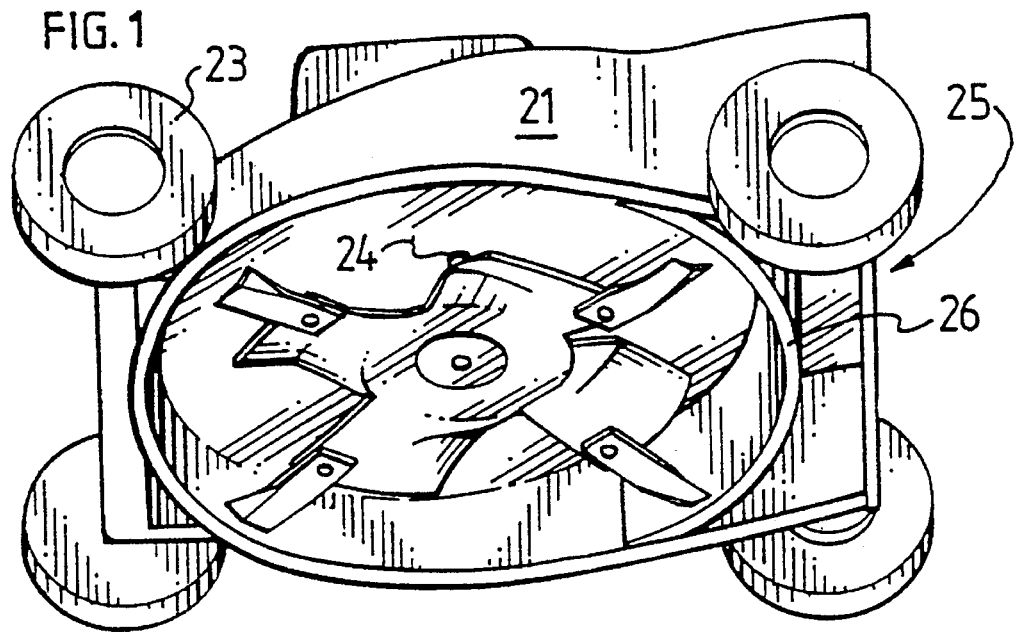
FIG. 1 shows a perspective view of a first preferred blade assembly according to the present invention attached to a rotary lawnmower, as seen from below.

The illustrated catching and mulching blade assembly is, according to the present invention, adapted to be installed in a conventional rotary lawnmower which, as shown in FIG. 1, conventionally includes a blade housing 21, a discharge chute 25 for ejection of lawn clippings, a motor 22, and wheels 23. The motor 22 is provided with a depending shaft projection 24 which extends downwardly into the space within the blade housing 21, to the lower end of which the catching and mulching blade assembly is attached with the use of an annular flange or similar mounting device as per conventional disc assembly detail.

Alternatively, the mulching and catching blade assembly is attached to a blade or drive shaft which is affixed to the blade housing 21 and driven remotely from the engine 22 by means of belts, chains, hydraulics or some other means (not shown).

Figure 2:
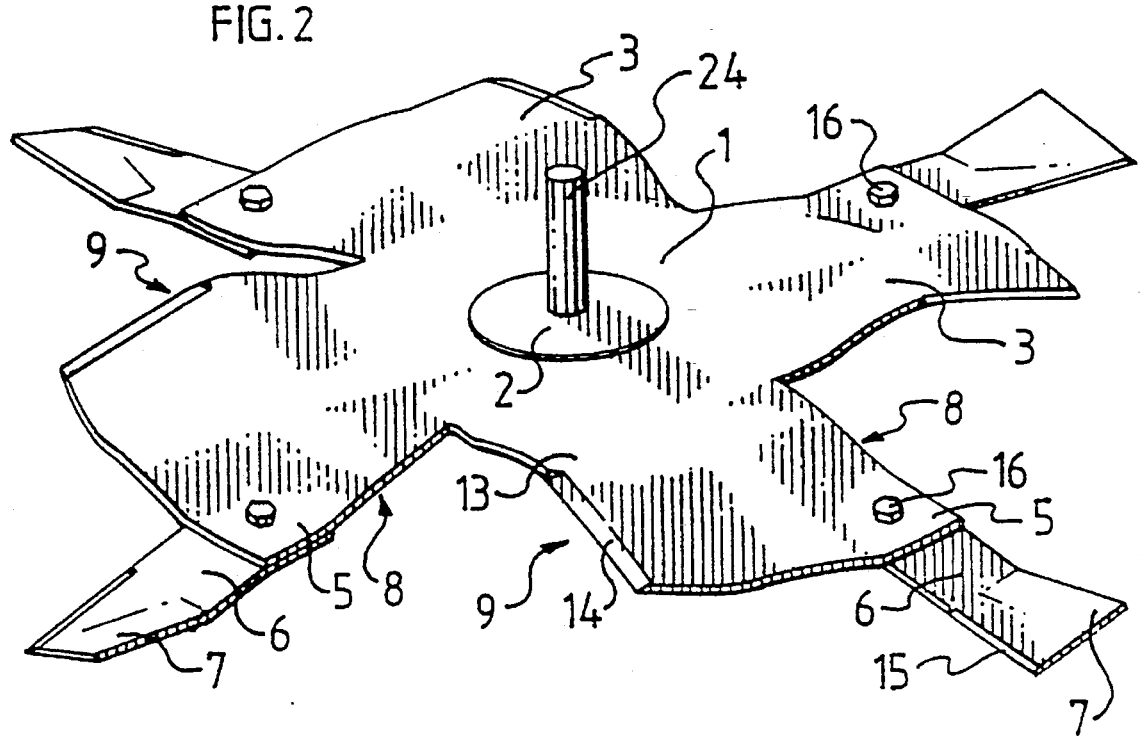
FIG. 2 shows a perspective view of the first preferred blade assembly, as seen from above.

The preferred blade assembly as shown in FIG. 2 comprises a central disc body 1 with a central mounting point 2 arranged for mounting on the shaft 24, and a number of vanes 3 radiating from said body 1, with apertures 4 between said vanes 3, and a number of primary blades or flail blades 6 extending from the periphery of said vanes 3. The central body 1 and vanes 3 comprise an inner region of the assembly, while the extending blades 6 comprise a peripheral region of the assembly, as referred to hereafter.

The disc body 1 is preferably made of a suitable metal, although other suitable materials could be used. The center of the disc body 1 is preferably raised somewhat above the cutting level of the blades 6 to facilitate various mounting attachments at the mounting point 2 and to provide clearance.

Figure 3:
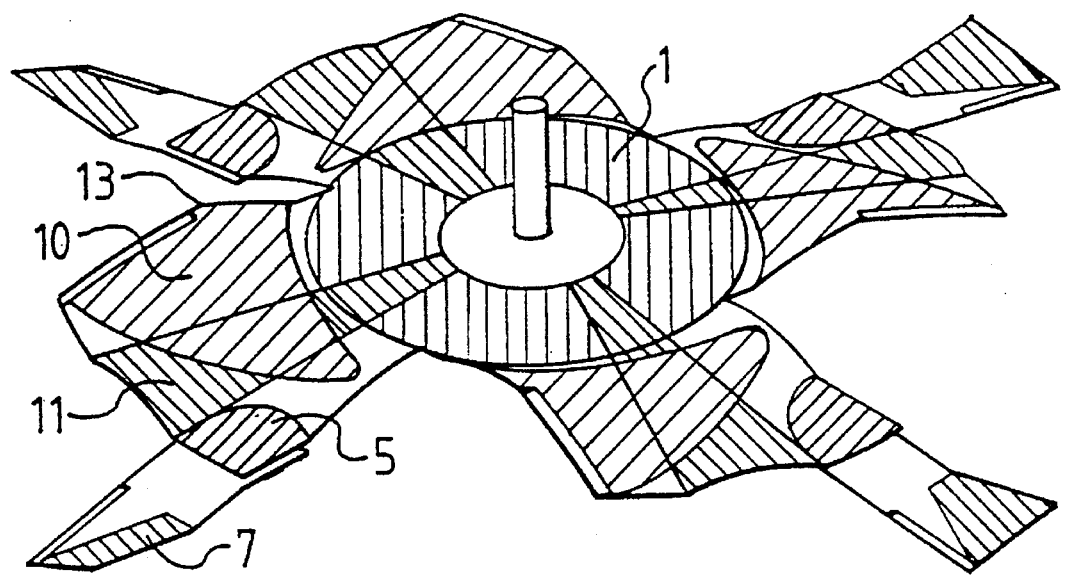
FIG. 3 shows a schematic perspective view of the first preferred blade assembly.

The vanes 3 are raised to a peak 13 partway along the leading edge 9, and slope downwards towards the root and the tip of the vane 3, and towards the trailing edge 8, to form a scoop or pocket 10, as shown schematically in FIG. 3. The inner region of the blade assembly accordingly acts as an impeller or fan. An area near the trig edge 8 towards the vane tip is made substantially flat to form a blade mounting area 5, and for reasons of rigidity and structural integrity it is preferable that the vanes 3 are cambered to create a ridge or rib 11 extending from root to tip, as represented in FIG. 3.

The leading edges 9 of the vanes 3 are preferably hardened and sharpened so as to form secondary cutting blades 14, as shown in FIG. 2. This sharpened edge 14 may be ground, pressed, machined or formed by die east from the material of the vane 3, or alternatively formed separately and then affixed to the vane 3 by welding, rivetting or some other suitable means.

The tips of the vanes 3 are preferably made substantially square and of at least similar or greater chord W than the root of the vane 3, in addition to being cambered and downwardly inclined, in order to enhance tip vortice formation as described hereafter.

The vanes 3 are preferably formed from the material of the disc body 1, being pressed and raised up at their leading edge 9 by a suitable tool and die, although it will be appreciated that this assembly may be die-east or otherwise constructed as separate fabrications and subsequently joined by welding, rivetting or other suitable means.

Figure 8:
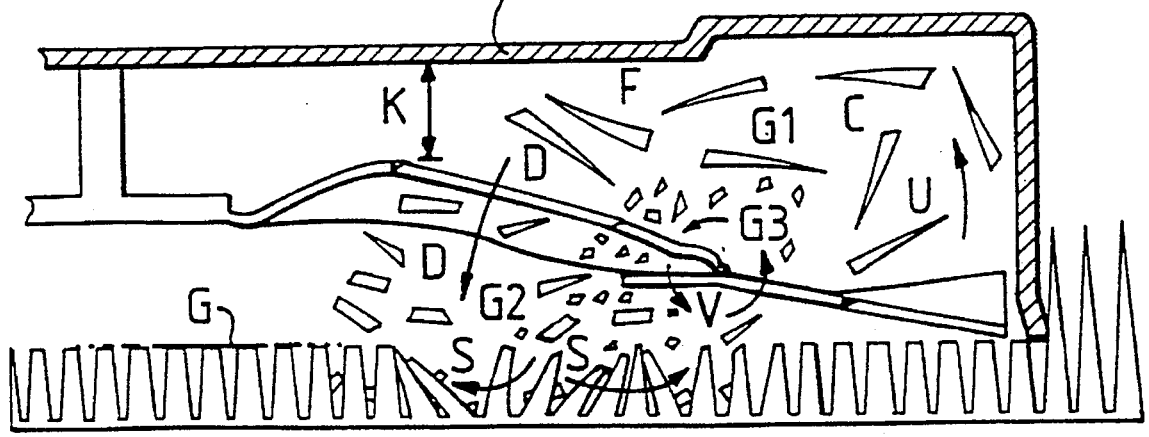
FIG. 8 is a diagrammatic representation of the path of cut clippings in a radial plane wig the blade housing.

The blades 6 are preferably made of a suitable metal such as spring steel strip, although other suitable materials may be used, and are preferably relatively thin and fiat with a suitably hardened and sharpened cutting edge 15 facing the direction of travel. The blades are preferably mounted horizontally, and twisted down at the outer end so as to bring the cutting edge 15 to a point below any other part of the assembly, providing a clearance between the cutting height G and the underside of the inner region, as shown in FIG. 8.

The blades 6 are also twisted upwards at the rear, which effectively causes the entire outer end section of the flail blade 6 to act as an airlift element 7, causing uplift U and circumferential circulation C around the periphery of the blade housing. The elements 7 are preferably inclined at an angle as shown in FIG. 9a great enough to induce stalling of airflow over the face of the flail blade 6, so as to cause suction in their wake which draws the cut material orbitally around the blade housing 21.

Replacing a set of highly twisted flail blades 6 with a set of blades 6 with less twist will allow the performance of the blade assembly to be customized for particular requirements, such as dedicated catching or dedicated mulching, in order to optimize the performance as desired.

The combined radially and axially extending face area of the blades 6, comprised largely by the upturned portions 7, should preferably always be less than the combined face area of the vanes 3 in the inner, impeller region. An important feature of the airflow generated by a blade assembly of the present invention is the relatively strong rotational flow, generated both at the periphery of the assembly and in the inner, impeller region defined by the vanes 3, as detailed hereafter. To maintain sufficient airflow in the inner region, the impelling faces in the inner region must be proportionately larger than those in the outer region, which move at a higher velocity when the assembly rotates.

A combination of blades 6 with more twist and blades 6 with less twist might also be employed to tune the overall efficiency.

The blades 6 are preferably pivotally attached to the underside of the vanes 3 at mounting points 5 by means of suitable bolts 16 rivets or other methods, as are conventional flail blades. It is preferable that the blade 6 has at least partial rotation, so that of an obstacle is encountered during operation the flail blade 6 is able to rotate backwards, as depicted by dashed outline 6' in FIG. 4. Fixed, non-pivoting blade tips could alternatively be bolted, welded or otherwise affixed to the vanes 3.

The position of the blade 6 mounting points 5 near the trailing edge 8 of the vane 3 as depicted in FIG. 3 has been found preferable for masons of causing less disturbance to airflow around the vane 3 and the generation of the tip vortices V, as well as allowing freedom of rotation of the flail blade 6 as mentioned above.

The blade assembly herein described is preferably of a similar diameter to a conventional disc assembly, so that the length of the flail blade 6 is in similar proportion to the overall diameter of the blade sweep as is conventional for a disc and flail blade assembly. The clearance between the flail blade 6 tips and the blade housing 21 is to be no less than the minimum permitted by the appropriate safety standards, and preferably only large enough to avoid jamming of grass and the like between the blades 6 and the inside of the blade housing wall 28.

Figure 4:
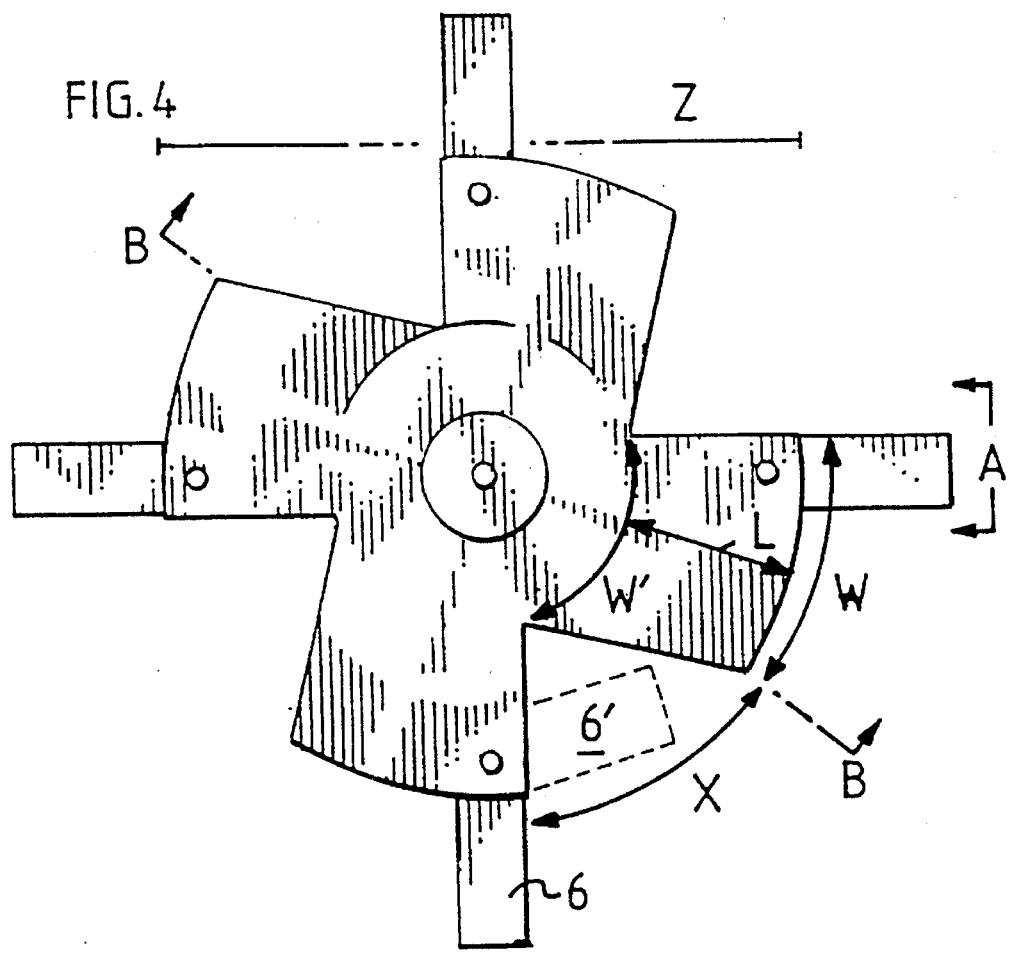
FIG. 4 shows a plan view of the blade assembly.

To give a typical set of dimensions:

With reference to FIG. 4, in a mower having a blade assembly which is 500 millimeters total diameter overall, the diameter Z of the inner region or impeller, comprised of the body 1 and vanes 3, will be approximately 340 mm, the length L of the vanes 3 will be approximately 100 mm, and the width of the vanes 3 will taper from approximately 115 mm W at the tip of the vane to approximately 105 mm W' at the root of the vane 3. The separation X between the tips of the vanes 3 will be approximately 140 min. This results in an inner region having a solidity ratio of approximately 0.65.

With reference to FIGS. 5 and 6, the preferred height H of the leading edge above the trailing edge of the vane will range from 8 mm at the root and tip, to 16 mm at the highest point of the front edge 9. The inner region impeller will preferably have a radially and axially extending face area of approximately 4000 mm$^2$, comprised of approximately 1000 mm$^2$ face area on each of the four vanes 3—the inner disc body 1 has no radially extending faces, being circular. The face area of the peripheral region, comprised largely of the upturned airlift elements 7 on the four blades 6, will be approximately 2800 mm$^2$, comprised of approximately 700 mm$^2$ on each blade 6.

OPERATION OF THE PREFERRED EMBODIMENT

The preferred blade assembly of the present invention can operate in either a mulching or a catching mode, depending on the nature of the housing in which it is mounted. Preferably, the mower can be switched from one mode to the other simply by opening or closing an outlet in the housing, with no modification or adjustment to the blade assembly.

The primary airflows including the uplift U, the circumferential C and the inner rotational R circulation are predominant over the secondary airflows regardless of the environment of the blade assembly. The primary airflows are much more powerful than the secondary airflows, and therefore have the greatest influence on the movement of the cut material, namely to circulate it substantially around the periphery of the blade housing 21 in a shallow trajectory.

The influence of the secondary airflows is inconsequential if an outlet 25 in the housing is open, because the primary airflows act to carry the cut material out through the outlet before the secondary airflows have any significant effect. However, if the blade housing outlet 25 is occluded so as to create a substantially closed environment, the primary airflows result primarily in circulation of the material within the housing, while the secondary airflows cause an alteration to the trajectory of the cut material, and carry it inwards and downwards through the vanes 3. Accordingly, the assembly can treat the cut material in two different ways, depending on whether the outlet 25 in the housing is open or closed.

CATCHING

For a catching operation, the housing is provided with an open outlet 25, leading either into a catcher, or simply to the exterior. Clippings are lifted and carried forwards on the airflow produced by the upturned airlift elements 7 as the blades 6 cut the lawn, and are propelled strongly around the housing in a continuous circumferential flow. From this flowpath, the clippings are thrown outwardly through the outlet 25 by the centrifugal, outward force of the rotational flow, for catching or dispersal.

As noted above, the preferred assembly has a greater face area in the inner region (A2 in FIG. 6) than in the peripheral region (A1 in FIG. 5), and has a solidity ratio in the inner region of greater than 0.5. Strong rotational circulation is augmented by the provision of a large face area on the vanes 3 in the inner, downdraft producing zone, which adds to the rotational flow produced by the elements 7 without similarly adding to the updraft.

The downdraft produced by the vanes 3 is regulated by the high solidity ratio of the inner region, described in more detail hereafter. Accordingly, inward flow F across the top of the assembly, resulting from peripheral updraft and central downdraft, is also controlled. Through the combination of a proportionately greater face area in the inner region than the peripheral region and a high solidity ratio, the vanes 3 are able to augment the rotational flow, without similarly augmenting the upward, inward and downward flow.

Inward flow is an impediment to good catching performance, so by restricting this flow and augmenting rotational flow, the blade assembly is able to enhance catching performance.

Figure 7:
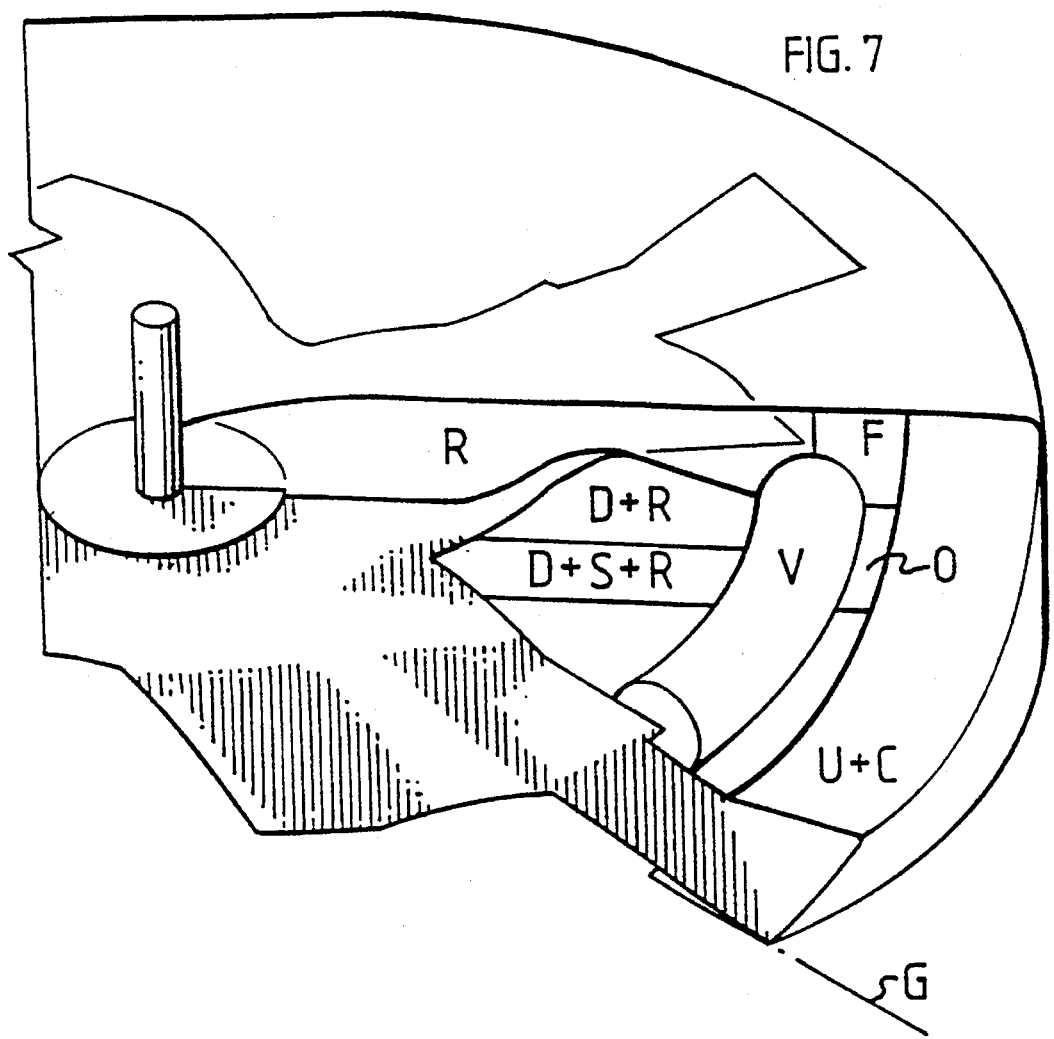
FIG. 7 is a diagrammatic representation of the airflows produced by the preferred blade assembly.

A tendency commonly noted with the prior art mulching systems when used for catching is to chop a large proportion of the clippings into small particles before discharging them from the blade housing (which releases juices and tends to cause clogging) due to the significant upwards and inwards airflows produced, The preferred embodiment of the present invention avoids this problem when catching, as the rotational circulation (R and C as shown in FIG. 7) is powerful enough to carry the clippings out the open discharge chute 25 before the inward airflow F has the opportunity to transport the clippings G1 to the inner cutting blades 14.

Sufficient circumferential circulation C is generated in accordance with the present invention to pre-empt the said secondary cutting, at least up to the point where the clippings are able to be discharged (even if the discharge chute 25 is disposed rearwardly on the blade housing 21).

In accordance with the above statements, the clippings G1 discharged from the discharge chute 25 during catching operations are therefore substantially bigger than the clippings G2 & G3 which are recirculated and eventually dispersed back into the lawn when mulching.

The strong rotational airflow also helps to maintain a more effective discharge into the catcher in unfavourable conditions, such as when mowing wet or lush grass, and helps to keep the inside of the blade housing 21 clean, with less tendency for clippings to accumulate inside the blade housing 21. This feature improves both the convenience as well as safety of the lawnmower, as the user has less need to access the interior of the blade housing 21 for periodic cleaning and unclogging, which access necessarily exposes said user to a certain degree of risk.

MULCHING

For mulching operation, the housing is closed. Preferably the discharge outlet is closed with a flap or block 26 which substantially fills any asymmetric recess at the outlet in the housing wall. This causes the airflows within the housing to be recirculated in a closed environment to some degree which allows the secondary airflows to become effective.

When mulching, the clippings are swept by the blade assembly through a different, extended series of operations from the simple circumferential flowpath followed in a catching operation. It is to be appreciated that the present invention therefore performs two discrete operations, selected essentially by whether the discharge chute is opened or closed and a catcher fitted.

The overall processes involved in the mulching operation are as follows:

1. Grass and the like initially cut at the outer periphery of the blade is imparted with compound motion both upwards and forwards into the circumferential airflow C by means of the primary blades 6 and lifting elements 7, as depicted in FIG. 7, and as in the catching operation described above.

2. The entrained cut clippings G1 are carried around the periphery of the blade housing in the circumferential airflow C in FIG. 8.

3. With no outlet in the housing the entrained clippings G1 in suspension in the circumferential airflow C spiral inwards due in part to continued uplift at the periphery generated by the flail blades 6 and downflow induced more centrally by the vanes 3.

4. Upon reaching the proximity of the tips of the vanes 3, in the boundary area between uplift and downdraft, the clippings G1 are carried substantially inwards and downwards by the inward flow F and tip vortices V, which reduces clogging of cut material on the underside of the housing 27 above the boundary area.

5. Once in the proximity of the vanes 3, the clippings are drawn between the vanes 3 and chopped into smaller pieces by the secondary cutting edges 14 on the outer end of the rotationally forward edges 9 of the vanes 3.

6. The smaller particles G2 & G3 are then in part dispersed into the lawn beneath the blade assembly by a combination of their own forward momentum and the airflows produced by the impeller, ie: the strong rotational circulation R, the downdraft D, the tip vortices V and the swirl S induced below the impeller.

7. Clippings which are not dispersed into the lawn may be drawn into the tip vortices V and rotated back into the recutting blades 14 where they are eventually cut into free particles G3 and dispersed into the lawn, or may be lifted by the primary blades 6 to be recycled through the process.

The overall solidity ratio of the inner region and the axial depth of the vanes acts to limit the downdraft, so that it remains relatively weak regardless of the housing configuration, the updraft, or the rotational flow. This provides a benefit to both the catching operation and the mulching operation. With regard to catching, the downdraft acts to draw air and clippings inwards contrary to the centrifugal, outward flow by which clippings are thrown into a catcher, and accordingly may be detrimental to catching efficiency.

With regard to mulching, a certain amount of downdraft is beneficial, in that it can carry clippings or mulch down into and onto the lawn beneath. Too strong downdraft is however found to be detrimental in that it tends to flatten the lawn beneath, interfering with cutting and inhibiting distribution of mulch under and amongst the lawn vegetation, and may also blow the mulch out from under the housing, forming windows to either side. Furthermore, clippings may be carried through the assembly and blown out before being adequately chopped and mulched.

The generation of downdraft is controlled and regulated in the preferred embodiment of the present invention by the inclination and chord of the impeller vanes 3, which create a strong, turbulent circumferential flow in the inner region.

When the housing outlet 25 is open for a catching operation, the downdraft is overwhelmed by the strong rotational flow and flow out through the outlet 25, and has no significant effect on the overall flow of clippings. When the housing is closed however, the rotational flow simply circulates air and cut material in a continuous, endless cycle around the housing. Accordingly, the weak downdraft D and consequent inflow F gradually draws the clippings inwards and downwards as they flow around, and finally carries them down into the lawn on a turbulent, generally shallow trajectory. In the turbulent flow created by the vanes 3 the clippings G1 first cut by the blades 6 are recur on the vanes 3 into smaller particles G2, and into smaller particles again G3 as they are recirculated through the inner region by the overall recycling effect produced. Suitably sharpened cutting edges 14 present at least on the outer portion of the leading edges 9 of the vanes 3 facilitate this recutting process.

The clippings and the like are swept into the lawn below the vanes 3 by means of both downdraft D and rotational circulation R as depicted in FIG. 7, which stirs the clippings and the like into the lawn to some degree with a turbulent, swirling action S as depicted in FIG. 7 and 8, below the cutting height G. By this means the blade assembly stirs the cut lawn, and avoids flattening it with downdraft which may be detrimental to good dispersal of the mulch.

Catching operation blade housings typically exhibit less clearance (depicted by K in FIG. 8) between the ceiling 27 of the housing and the blade assembly at one radial cross-section, and more clearance at another, than that typical for mulching mowers. This results in differences in the restriction of inwards or downwards flow.

The present invention achieves satisfactory performance with less sensitivity to such variations in the airflow, as the assembly itself is the most dominant influence on airflows in the dispersal area.

By generating strong circumferential C and rotational R circulation (in comparison to the downdraft) in conjunction with maintaining an acceptable downwards airflow D the effectiveness of the said dispersal is rendered more independent of the said inward and downward circulation, and the cross sectional shape of the blade housing.

An assembly with vanes 3 which are of more or less equal length and chord proportions, (depicted by L and W in FIG. 4) set at a downward angle from the leading 9 to trailing 8 edges of the vane 3 in the order of approximately 1 in 8, and which has a solidity ratio of more than 0.5 has proven acceptable.

Incorporating a substantially flat horizontal plane 5 at the trailing edge 8 of the vane 3 of approx. 25% of the overall chord W of the vane 3 has proven to be an effective means of enhancing the rotational circulation R and the swirl S (depicted in FIG. 7 and 8), particularly in the area of dispersal under the impeller, as well as providing a double or reverse ember in the vane 3 for rigidity and a suitably flat area for mounting the pivoting blades 6.

It has been found that while impellers with a solidity ratio as high as 1 (in the case of an impeller which has vertical apertures between the vanes) can produce satisfactory results, the best results have been obtained using impellers with solidity ratios in the range of 0.6 to 0.8. Because of the lesser tendency towards clogging and lesser weight, an impeller with a solidity ratio near 0.7 is considered ideal.

Figure 9:
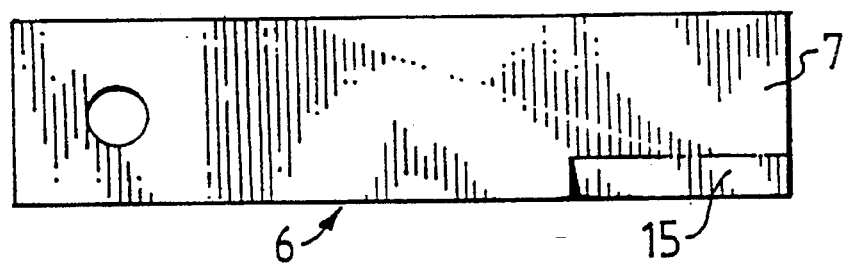
FIG. 9 shows a plan view of the preferred flail blade.
Figure 9A:
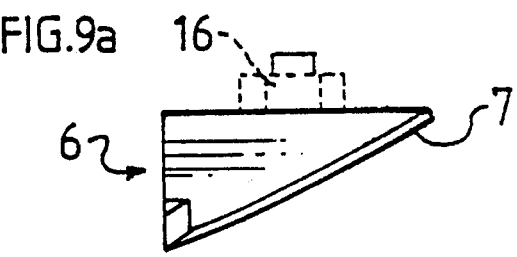
FIG. 9a shows an end view of the flail blade of FIG. 9.

A restrictive blade housing such as that depicted in FIG. 9 causes accumulation of mulched particles and clippings on the underside of the ceiling of the blade housing 27, notably in the boundary area between uplift and downdraft, referred to as clogging. This problem of clogging above the boundary area is somewhat remedied by the increased circumferential C and rotational R circulation within the blade housing 21 generated by this new blade, as well as by the generation of powerful rotational currents of air in this boundary area known as tip vortices, depicted by V in FIGS. 7 and 8.

Disposing the vanes 3 at a moderate downward angle from rotationally leading 9 to trailing edges 8 (below the stall angle), creates differential air pressure above and below the vanes 3. Cambering the said impeller vanes 3 in a similar manner to an aerofoil such as an aeroplane wing, ie: upwards along the length L from the root to the tip of the vane 3, in the order of several percent of the chord W, further enhances this pressure difference, as well as improving the rigidity and resistance to flexing of the vane 3. This difference in pressure produces vortices (V in FIG. 8) at the vane 3 tips (as opposed to random swirling or turbulence).

The adoption of substantially square tips enhances the vortice generation, as does an increase in the chordwise span (depicted by W in FIG. 3) towards the tips of the vanes 3 in comparison to the chord at the root of the vane 3.

The midpoint 13 of the vane 3 is raised to a greater angle of incidence I than the root or tip portions, resulting in a gullwing shaped vane 3 as depicted in FIG. 5. This allows twist-off towards the tip of the vane 3 while maintaining the tip of the vane 3 at an incident angle (I' in FIG. 5) sufficient to induce useful vortice formation, without increasing the overall angle of incidence of the vane 3 (which would cause overdrafting). Such a configuration further allows the formation of a lower pressure zone towards the center of the assembly which reduces outflow O below the impeller to some degree, and directs airflow towards the center of the assembly.

The tip vortices V result in significant localized toroidal airflow about an axis along the path of rotation of the tips of the vanes 3, upwards and inwards over the outside edge of the tips of the vanes 3 and then downwards and outwards again behind each vane 3, as depicted diagrammatically in FIG. 8. This vortex rotation V is substantially inwards at the top of its cycle, complementing the overall inwards flow of the clippings towards the vanes 3, and therefore contributes towards independence of the airflow from the cross-sectional configuration of the blade housing.

The generated tip vortices improve the overall airflow disposition and entrainment of clippings in suspension and may contribute towards a decrease in the above-mentioned problems, namely clogging of cut material in the boundary area above the vane 3 tips, as well as improving the dispersal of the recut clippings. The rotation induced by the said tip vortices V also aids the upward and inward airflow produced by the flail blades 6 to lift the clippings, depicted by G1 in FIG. 8, and helps transport them inwards for further circulation through the dispersal area. Thus, a significant proportion of clippings G2 & G3 can be kept in suspension and recirculated within the blade housing substantially above and in the vicinity of the impeller, regardless of variations in the cross-sectional shape of the housing 21, as depicted in FIG. 8.

Figure 10:
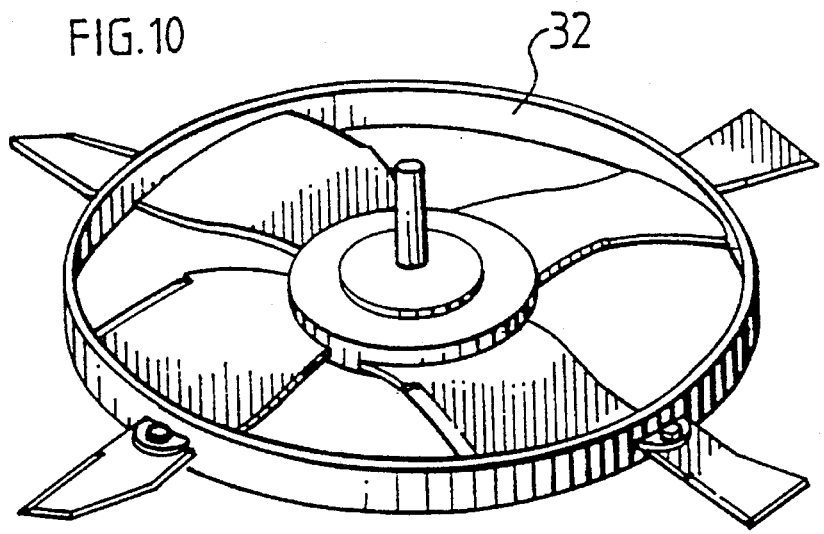
FIG. 10 shows a perspective view of a second embodiment of the invention.

It is to be appreciated that a wide variety of changes and modifications might be made to the above example within the general scope and spirit of the invention. As shown in FIG. 10 a reinforcing ring 31 of suitable material may be affixed towards the outer end of the vanes 3, in order to provide stiffness to the impeller assembly.

The application of ribs 11 as shown in FIG. 3, pressed into the vanes 3 and extending radially towards the center of the disc body 1 some distance has been found to provide a satisfactory degree of stiffness to the vanes 3, obviating the application of reinforcing ring 31.

It has been found that while using impellers with two or three vanes 3 achieves acceptable results in some instances, four vanes 3 with four blades 6 attached, as depicted in FIG. 2, produces especially satisfactory results for both catching discharged clippings or alternatively dispersing mulched clippings back into the lawn on a variety of housing configurations. Four vanes 3 allows provision of four secondary cutting blades 14, resulting in more effective recutting of the grass clippings G1 than by two or three. Likewise, four vanes 3 and consequently four vane tips are more effective in producing the primary and secondary airflows and dispersal mechanisms described above than two or three.

The provision of four primary blades 6 for cutting and uplifting the grass clippings G1 reduces the mount of cutting performed by each blade, thereby enhancing the fineness of the cut and the effectiveness of each primary blade 6 and lifting element 7. More even propulsion is also provided by the use of a multiplicity of primary blades 6 (at least four preferably) with uplift producing elements 7.

Although some slight advantage may be perceived with the application of a greater number of vanes 3 or flail blades 6 or both, for reasons of practicality, cost, weight and reliability four vanes 3 in conjunction with four flail blades 6 are considered optimum for producing satisfactory results.

The vanes may be substantially flat or uniform along their radial lengths, as an alternative to the "gull-wing" form illustrated in FIGS. 1 to 9, although this is considered less preferable at present. Inclining the mounting area 5 on the impeller vane 3 upwards towards the rear edge 8 of the vane 3 (so as to angle the flail blade 6 upwards towards the trailing edge according to rotation) improves the performance of this system for catching of discharged clippings, and allows the flail blade 6 to pivot upwards and backwards if an obstruction is encountered. However, the induced downflow consequently decreases, with a corresponding drop in performance when mulching and dispersing the clippings back into the lawn.

The mounting point 5 of the flail blade 6 is therefore preferably set more or less horizontally (so that the flail blade 6 pivots substantially in the horizontal plane as per convention) approximately 10 millimeters above the cutting height G. The rotationally forward edge of the flail blade 6 is twisted downwards at an increasing angle towards the outer end of the flail blade 6, to the desired cutting height G as depicted by T in FIGS. 9a and 9b, while the outer end of the trailing edge is twisted upwards to form a small fin 7.

Figure 9B:
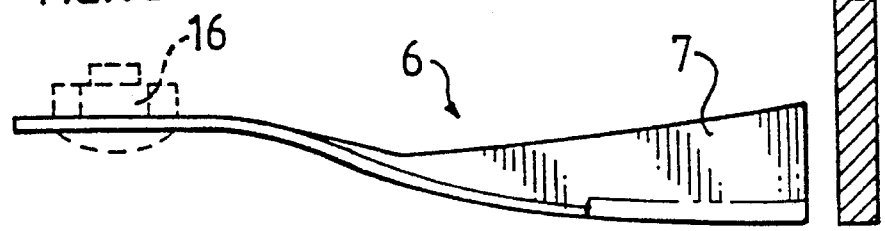
FIG. 9b shows a front view of the flail blade of FIG. 9.

The incorporation of a small step in the flail blade 6 as shown in FIG. 9b has been found beneficial, to lower the inclined trailing edge fin 7 of the flail blade 6 sufficiently to permit the flail blade 6 to retract pivotally in a full circle, obviating the possibility of the flail blade 6 striking the vane 3 from which the flail blade 6 depends. This minimizes possible damage to the flail blade 6 as well as to the supporting vane 3, and also avoids jamming of the flail blade 6 against or beneath the vane 3 when an obstruction to the flail blade 6 is encountered.

This blade design significantly reduces the likelihood of deforming the crankshaft or damaging the blade housing or blade assembly itself, while facilitating the replacement of the primary wear elements easily and cost effectively.

A high solidity ratio impeller has the advantage of allowing stiff but light fabrication, providing stable mounting points for the primary cutting blades or flail blades 6.

The occlusion provided by fie central body 1 of the preferred embodiment shields the shaft 24, and thereby discourages flax and other long leaf vegetation as well as rope and the like from becoming entangled around the mower or engine shaft 24. As mulching blades by design induce circulation F inwards toward the said blade shaft 24, they are particularly prone to entangling such impediments around the blade or drive shaft Therefore a mulching blade with the means for helping to avoid or at least reduce this problem is of particular advantage.

The preferred embodiment of the present invention is also found to reduce noise and turbulence set up inside the blade housing, due to the relatively even distribution of air-impelling faces, both across and around the assembly, resulting in a generally smoother and quieter operation than many conventional blade assemblies.

The present invention has the tendency to begin to recut and consequently disperse excess clippings back into the lawn if outflow from the discharge chute 25 is prevented, such as once the catcher is full. This helps to avoid clogging of the blade housing 21 with untaught clippings which may otherwise cause the engine to eventually stall, as well as forestailing the need to empty the catcher, thus allowing the user to empty the catcher at his or her convenience.

Safety is also enhanced with this system, as there is likewise lessened tendency for clippings to build up and become clogged in the discharge chute 25 once the cateher is full, which may otherwise tempt the user to try to clear the clogged discharge chute 25 while the blades are in motion.

Further to these points, a high solidity ratio impeller also presents smaller openings 4 for the intrusion of solid objects, sticks, rods and the Like between the impeller vanes 3, which objects could cause damage to either the impeller itself or to the engine or blade shaft 24 on which it depends. It is to be appreciated that the higher the solidity ratio becomes, the less the chance of insertion of an object between the vanes 3.

Pivotally mounted flail blades 6 have been found to have several advantages over non-pivoting blade tips, such as reducing the risk of damaging the blade housing 21, the impeller assembly, the engine or blade shaft 24 or engine itself 22 of a rock, tree root or other impediment is struck by the said flail blade 6, as the pivoting action of the flail blade 6 reduces the likelihood of abruptly halting the rotation of the blade and shaft 24 assembly, thereby lessening the likelihood of deforming the engine 22 or blade shaft 24. While using flexible wire as the primary cutting element as described in U.S. Pat. No. 49,245, in conjunction with separate fins or other means for producing uplift at the outer periphery of the blade is another alternative, pivoting flail blades 6 are preferred for simplicity.

The weight of the preferred assembly is generally less than that of a comparable size disc and flail blade assembly. This has a number of advantages, namely reducing the weight of the assembly for fabrication, handling and transport; lowering the cost of the material itself for both purchasing and treating; lowering the inertia of the assembly for aiding both starting the engine and stopping rotation within a minimum time from switching the motor off.

It will be appreciated that the provision of these secondary features and/or advantages in the preferred embodiment does not comprise the object of the invention, and that alternative embodiments which fail to provide any one or more such advantages may nonetheless fall within the scope of the present invention.

In summation, providing a strong rotational and circumferential airflow and regulating the downward airflow, in addition to generating tip vortices and swirl, is advantageous for coping with wet, lush grass, cross-sectional housing variations and restrictions, and other variable factors influencing mulching and/or catching performance. The airflow also has advantages when catching discharged clippings, such as improved particle size and speed at which particles are discharged, as well as less clogging of clippings inside the blade housing.

It will be appreciated that alterations to the preferred embodiment described above may improve performance in one area at the expense of performance in another area.

ALTERNATIVE EMBODIMENTS

Figure 11:
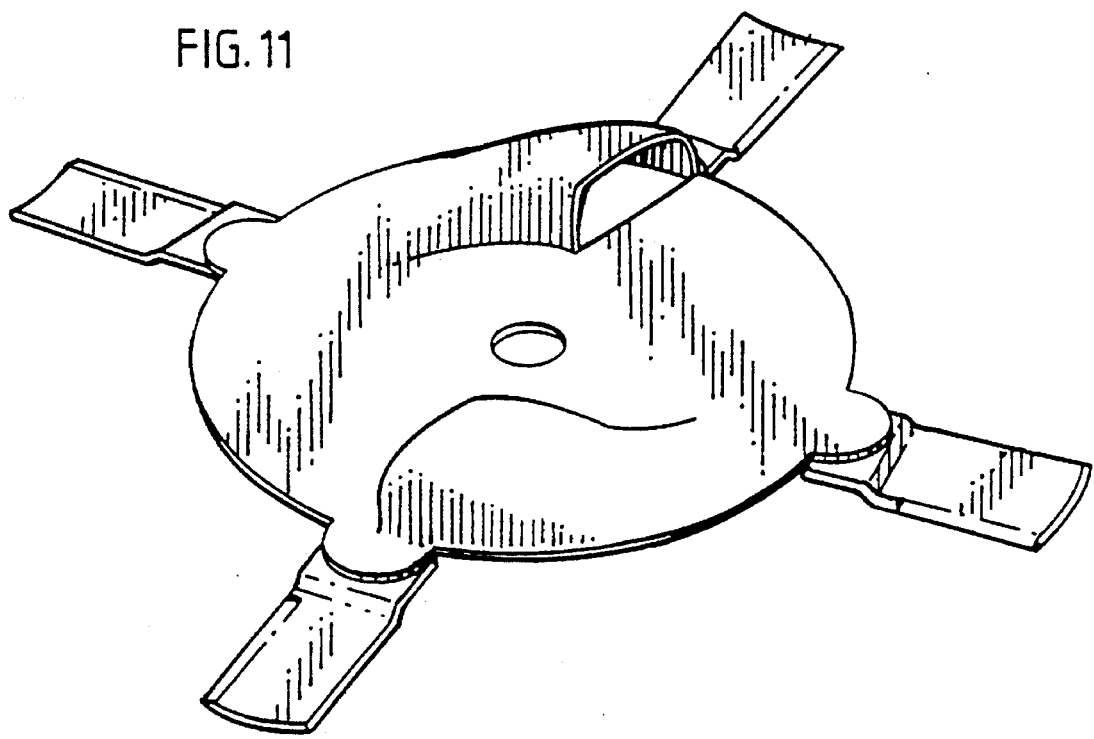
FIG. 11 shows a perspective view of a third embodiment of the invention.

An alternative embodiment is shown in perspective view in FIG. 11, which incorporates scoops formed out of a complete disc. This embodiment is at present considered less preferable than that shown in FIGS. 1 to 9—it does not produce tip vortices at the edge of the inner region, manufacture is more difficult, and the overall weight of the assembly is greater.

Figure 12:
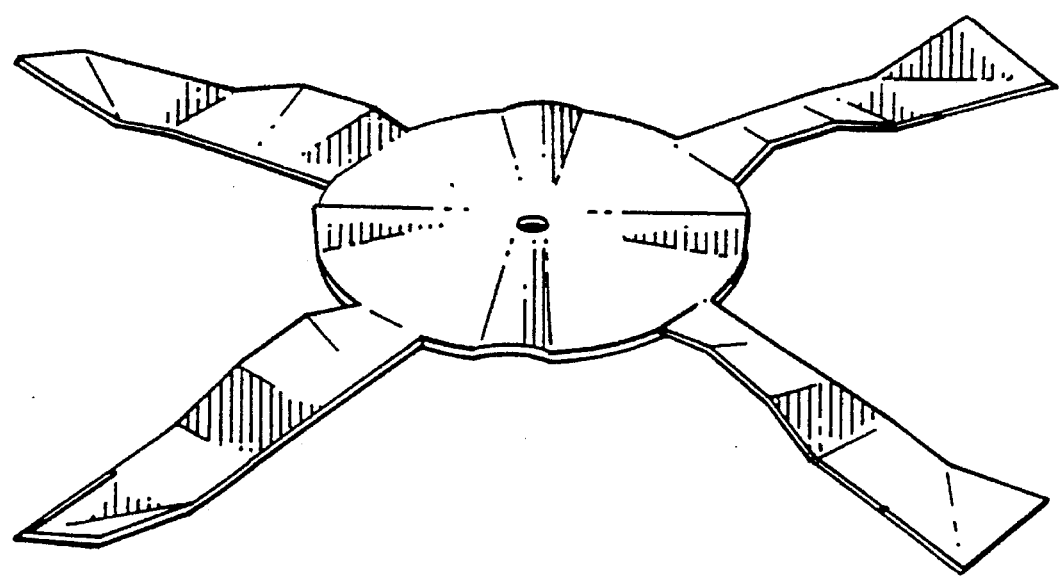
FIG. 12 shows a perspective view of a fourth embodiment of the present invention.

Another embodiment as shown in perspective in FIG. 12 is the provision of a solid disc, of less diameter than the preferred disc described above. At least four flail blades with means for producing uplift, downdraft and strong circumferential circulation are provided, of sufficiently increased length to compensate for the smaller diameter disc. Raising the front edge of the flail blades inwardly from the primary cutting and uplift area to encourage downdraft, as well as sharpening the leading edge of said flails in this inner position also is beneficial. The use of a blade housing of substantially flat, uniform cross section above the said flail blades, preferably within 100 mm or so but with ample clearance, has also been found beneficial, as said roof tends to deflect the uplifted air and clippings and direct them down into the lawn.

This embodiment is more reliant on the shape of the blade housing, although increased circumferential circulation is generated and aids the dispersal of clippings back into the lawn. Some of the advantages realized with the preferred embodiment are lost, such as the ability to operate independently of the blade housing shape. Furthermore, the weight of such a solid disc is not desirable. Hence this embodiment, while possibly allowing easier and more cost effective fabrication, is not viewed as preferable.

Other changes and modifications might also be made within the general spirit and scope of the invention, which may be characterized by the following claims.

I claim:

1. A blade assembly for a rotary cutter, comprising:

means (2) for mounting the blade assembly on a central shaft (24);

a generally planar body substantially evenly disposed about said mounting means (2), said body having an inner region and a peripheral region;

means (15) for cutting in the peripheral region;

means (7) for creating an updraft in the peripheral region;

means (3) for creating a downdraft in the inner region; and means (3, 7) for creating a rotational airflow in the peripheral region, said means (3, 7) having a radially and an axially extending face area of said body, by which air can be moved as said body rotates on said central shaft (24);

characterized in that said face area of said inner region is greater than said face area of said peripheral region;

further characterized in that said means (7) for creating updraft includes a plurality of outwardly projecting generally planar blades in said peripheral region, each of said blades being at least in part inclined upwards between a leading edge (9) and a trailing edge (8) relative to a direction of rotation of the blade assembly; and furthermore characterized in that said blades are twisted substantially downwards at outer ends, to a level below a lower edge of the body.

2. A blade assembly according to claim 1, characterized in that four blades are provided.

3. A blade assembly according to claim 1, characterized in that said leading edge includes said cutting means (15).

4. A blade assembly according to claim 1, further characterized in that said blades are fixed substantially parallel to a general plane of said body, and twisted both downwards at the rotationally leading edge (9) and upwards at the rotationally trailing edge (8) towards the outer ends, to create said uplift.

5. A blade assembly for a rotary cutter, comprising:

means (2) for mounting the blade assembly on a central shaft (24);

a generally planar body substantially evenly disposed about said mounting means (2), said body having an inner region and a peripheral region;

means (15) for cutting in the peripheral region;

means (7) for creating an updraft in the peripheral region;

means (3) for creating a downdraft in the inner region; and means (3, 7) for creating a rotational airflow in the peripheral region, said means (3, 7) having a radially and an axially extending face area of said body, by which air can be moved as said body rotates on said central shaft (24);

characterized in that said face area of said inner region is greater than said face area of said peripheral region;

further characterized in that said inner region has a plan solidity ratio to swept area of greater than 0.5.

6. A blade assembly according to claim 5, characterized in that said means (3) for creating the downdraft and said means (3, 7) for creating the rotational airflow include vanes (3) in said body angled downwards from a leading edge (9) to a trailing edge (8) relative to a direction of rotation.

7. A blade assembly according to claim 6, characterized in that four vanes (3) are provided.

8. A blade assembly according to claim 6, characterized in that said vanes (3) are of similar chord at a tip (W) as at a root (W').

9. A blade assembly according to claim 5, further comprising means for creating a toroidal vortex between said inner region and said peripheral region of the body.

10. A blade assembly according to claim 9, characterized in that said means (3) includes vanes (3) being chambered upwards towards the central shaft (4) to form a radially extending ridge (11), to create a pressure differential between upper and lower surfaces of said vanes (3) in use, thus inducing the toroidal vortex.

11. A blade assembly according to claim 19, wherein said vanes (3) extend radially outwards over at least half a radius of said inner region of the body.

12. A blade assembly according to claim 5, characterized in that said plan solidity ratio is between 0.6 and 0.8.

13. A blade assembly for a rotary cutter, comprising:

means for mounting the blade assembly on a central shaft;

a generally planar body substantially evenly disposed about said means for mounting on the central shaft, said body having an inner region and a peripheral region;

means for cutting in the peripheral region;

means for creating an updraft in the peripheral region;

means for creating a downdraft in the inner region; and means for creating a toroidal vortex between said inner region and said peripheral region;

a plan area of said inner region is greater than a plan area of said peripheral region;

wherein said means for creating a toroidal vortex includes a plurality of vanes being cambered upwards towards a center of each vane to form a radially extending ridge, to create a pressure differential between upper and lower surfaces of said vanes in use, thus inducing the toroidal vortex.

14. A blade assembly for a rotary cutter, comprising:

means for mounting the blade assembly on a central shaft;

a generally planar body substantially evenly disposed about said means for mounting on the central shaft, said body having an inner region and a peripheral region;

means for cutting in the peripheral region;

means for creating an updraft in the peripheral region;

means for creating a downdraft in the inner region; and means for creating a rotational airflow, having a radially and an axially extending face area of said body, by which air can be moved as said body rotates on said central shaft;

wherein a plan area of said inner region is greater than a plan area of said peripheral region and said inner region has a plan solidity ratio to swept area of greater than 0.5.

15. A blade assembly according to claim 14, characterized in that said plan solidity ratio is between 0.6 and 0.8.

16. A blade assembly for a rotary cutter, comprising:

means for mounting the blade assembly on a central shaft;

a generally planar body substantially evenly disposed about said means for mounting on the central shaft, said body having an inner region and a peripheral region;

means for cutting in the peripheral region;

means for creating an updraft in the peripheral region;

means for creating a downdraft in the inner region; and means for creating a rotational airflow, having a radially and an axially extending face area of said body, by which air can be moved as said body rotates on said central shaft;

wherein a plan area of said inner region is greater than a plan area of said peripheral region and a plurality of blades is twisted substantially downwards at outer ends of the blades, to a level below a lower edge of the body.

17. A blade arrangement for a rotary cutter, comprising:

a body mountable for rotation about a substantially vertical, rotational, central axis;

said body having a peripheral region which is provided with cutting means which project outwardly and means for creating an updraft in a space swept out by the body as the body rotates about the central axis;

said body also having an inner region which is located between the peripheral region and the central axis;

said inner region being provided with means for creating a downdraft in a space located between the peripheral region and the central axis;

said inner region also having a plurality of projections which are spaced about the central axis and which extend outwardly therefrom;

at least two of said projections each carrying one of the cutting means which project outwardly; and said projections each having a leading edge which is angularly spaced from a leading edge of each cutting means and which angularly intersects an outer edge of each projection.

18. A blade arrangement according to claim 17, in which the inner region has a solidity ratio of not less than 0.5.

19. A blade arrangement according to claim 18, in which the solidity ratio is between 0.6 and 0.8.

20. A blade arrangement according to claim 17, in which each of said at least two projections includes a vane that is angled downwardly from a leading edge to a trailing edge of the vane for creating the downdraft when the body is rotated.

21. A blade arrangement according to claim 20, in which the vane carries the cutting means that projects outwardly.

22. A blade arrangement according to claim 21, in which the vane has a cambered formation for creating the downdraft, said cambered formation extending from the leading edge of the vane towards the trailing edge of the vane.

23. A blade arrangement according to claim 21, in which the cutting means is twisted substantially downwards at the outer end thereof so that the leading edge thereof is located below the vane.

24. A blade arrangement according to claim 20, in which the leading edge of the vane angularly intersects the outer edge of each projection and also wherein the leading edge of each cutting means is angularly spaced from the leading edge of the vane.

25. A blade arrangement according to claim 24, in which the cutting means is shaped to create the updraft.

26. A blade arrangement according to claim 25, in which the cutting means has a width which is less than a width of the vane.

27. A blade arrangement according to claim 26, in which the cutting means is located adjacent to the trailing edge of the vane.

28. A blade arrangement according to claim 24, in which the inner region and the peripheral region each have a radially and an axially extending face area, said face area of the inner region being greater than the face area of the peripheral region.

29. A blade arrangement according to claim 28, in which the body has four vanes and four cutting means mounted one on each vane.

30. A blade arrangement according to claim 24, in which the vane has a root having a width that is similar to the width of the vane at the outer edge thereof.

31. A blade arrangement according to claim 30, in which the vane extends outwardly over at least half of the inner region.

32. A blade arrangement according to claim 24, further comprising:

means for creating a toroidal vortex between the inner region and the peripheral region.

33. A blade arrangement according to claim 20, in which the vane includes a cambered region extending outwardly from the central axis and being disposed between the leading edge of the vane and the trailing edge of the vane.

34. A blade arrangement according to claim 33, in which the vane has a flat region disposed between the cambered region and the trailing edge, said cutting means being pivotably mounted on the flat region.

* * * * *